United States Patent
Cheng

[19]

[11] Patent Number: 6,006,600
[45] Date of Patent: Dec. 28, 1999

[54] PRESSURE ALARM DEVICE

[76] Inventor: Li-Hua Cheng, No. 14, Lane 27, Section 1, Chung-Hua South Road, Tainan City, Taiwan

[21] Appl. No.: 08/897,687

[22] Filed: Jul. 21, 1997

[51] Int. Cl.$^6$ .......................... B60C 23/02; B60C 23/00; H01H 35/00

[52] U.S. Cl. ...................... 73/146.5; 73/146.8; 340/442; 200/61.22; 116/34 R

[58] Field of Search .............................. 73/146.5, 146.8; 340/442; 200/61.22, 61.25, 61.26; 116/34 R

[56] References Cited

U.S. PATENT DOCUMENTS

| | | | |
|---|---|---|---|
| 2,037,969 | 4/1936 | Duty et al. | 116/34 R |
| 4,024,829 | 5/1977 | Su | 116/34 R |
| 4,103,549 | 8/1978 | Schmidt | 73/146.8 |
| 4,734,674 | 3/1988 | Thomas et al. | 200/61.25 X |
| 4,814,745 | 3/1989 | Wang | 73/146.8 X |
| 4,945,337 | 7/1990 | Huang | 340/442 |
| 5,289,161 | 2/1994 | Huang | 73/146.5 X |
| 5,604,481 | 2/1997 | Lin | 73/146.8 X |

*Primary Examiner*—Harshad Patel
*Assistant Examiner*—Robin C. Clark
*Attorney, Agent, or Firm*—Bacon & Thomas

[57] ABSTRACT

The invention herein relates to a kind of tire pressure alarm device that mainly consists of a cap installed on a connector body, with a trigger device and a power supply fixture installed within the internal space surrounded by the said connector body and the said cap; a pressure switch that includes an active recessed seat having a circular contact edge and which is capable of upward and downward movement within the confines of a guide ring mount, with the lower section positioned against the top of a diaphragm; a hollow threaded base that is fastened onto a mounting base at the upper extent of the active recessed seat and in which the coil spring contained inside the active recessed seat is secured with an adjustment screw; and a conductive ring, the circular edge of which contacts the outer circumference of the active recessed seat such that electric power is conducted between the conductive ring and the trigger device. The metal connector base and the plastic sleeve base of the connector body are formed as a single integrated unit and the said cap is screwed onto the sleeve base. The connector base is divided into two spaces by a spacer mount, of which one space has internal threads as well as a valve nozzle, and can be fastened to the threads on a tire valve stem and the space on the other side conjoined to the said sleeve base contains the components of the said pressure switch and, furthermore, all the components of the said pressure switch are inserted in the same direction.

4 Claims, 4 Drawing Sheets

PRESSURE ALARM DEVICE

BACKGROUND OF THE INVENTION

1. Field of the Invention

The invention herein relates to a kind of tire pressure alarm device that is of an uncomplicated structure, is not easily damaged and easy to assemble.

2. Description of the Related Art

Low tire pressure during vehicular travel is a frequent cause of automobile accidents and an alarm device that warns of insufficient tire pressure is urgently needed. As indicated in FIG. 1, previous tire pressure alarm devices had an insulative connector body (1) and a cap (2) mounted on the top, with a ring seal (10) installed between the connector body (1) and the cap (2), and positioned from top to bottom between the top section of the connector body (1) and the cap (2) were three circuit boards having surface mounted electronic components that formed the trigger device (31), and the power supply fixture (32) comprised of three batteries (321) installed in series, with a shell sleeve (322) constructed of an insulative material constitutig the exterior section of the batteries (321). An insertion hole (323) was drilled through the center of the shell sleeve (322) and installed at the insertion hole (323) by clipping, the trigger device (31) was mounted between the power supply fixture (32) and the spring (33) at the negative terminal at the topmost section of the batteries (321), and positioned at the bottom section of the shell sleeve (322) was a hollow recessed extension ring (34); the said extension ring (34) had an extension strip (341) that protruded upward and directly contacted the positive terminal of the said trigger device (31); inside the lower interior end of the connector body (1) was a brass threaded base (11) and the exterior section of the other end was covered by a metal protective shell (12), of which the hollow interior section of the threaded base (11) formed an air pressure chamber (111) for the induction of pressurized air, and the lower end had internal threads (112) that could be screwed onto the stem of a tire valve, and the said internal threads (112) were equipped with an oil seal (113) and a thrust rod (13) centered inside an air hole (131) such that the lower end of the thrust rod (13) was capable of pushing open the valve of the tire valve stem, thereby enabling air to pass into the air access hole (131) of the air pressure chamber (111) through the connector body (1), with the air pressure serving to produce the upward and downward movement of the flexible diaphragm (41) in the pressure switch (4) and, according to two presettable contact points, produce the continuity or non-continuity which determined whether the controlling trigger device (31) was provided with the electric current from the power supply fixture (32) required to invoke an audible signal. The said pressure switch (4) includes the diaphragm (41) that is mounted and sealed to the upper extent of the thrust rod (13) and the protrusion (411) at the center of the top section is capable of upward movement when pushed by air pressure; an active recessed seat (42) capable of upward and downward movement with the fixed confines of a guide ring (43), with the active recessed seat (42) having an upward facing opening and an outward projecting circular contact edge (421) and, furthermore, a hole (422) drilled at the center of the bottom section and the bottom surface against the protrusion (411) of the diaphragm (41); a coil spring (44) installed inside the active recessed seat (42); a hollow threaded base (45) that is positioned at a suitable interval at the upper extent of the active recessed seat (42) and has internal threads (451) along the interior and, furthermore, serrations (452) around the upper and lower circumference to prevent slippage; a conductive ring (46) fixed to the outer circumference of the active recessed seat (42), such that just before the active recessed seat (42) is supported by the top end of the diaphragm (41), the circular edge (421) contacts the inner edge along the top surface of the conductive ring (46) and, furthermore, the outer edge along the top surface of the conductive ring (46) is in solid contact with the relatively thin conductive extension ring (461), such that the pair of extension strips (462) projecting in an upward curve from the opposite sides of said extension ring (461) contacts the bottom surface of the extension ring (33) sleeved onto the lower end of the said shell sleeve (322) and thereby establishes continuity with the positive terminal of the power supply fixture (31) circuit and, furthermore, an adjustment screw (47), of which the external threads (472) of the head section (471) are screwed to the internal threads (451) of the hollow threaded base (45), and there is a shaft hole (473) through the center of the head section (471) as well as a slot (474) in the top surface to provide for the insertion of a screw driver, thereby enabling the upward and downward turning of the adjustment screw (47) to adjust the coil spring (44) that alters the pressure of the active recessed seat (42) exerted against the diaphragm (41).

Although conventional tire pressure alarm device are ideal in many respects, the said devices are quite difficult to utilize in actual application because: (1) Of the two different spaces formed in the upper and lower sections of the connector body (1), the active recessed seat (42), the coil spring (44), the hollow threaded base (45), the conductive ring (46), the extension ring (461) and the adjustment screw (47) are inserted into the upper space, while the diaphragm (41), the ring shell (43) and the threaded base (11) with the installed thrust rod (13) and the oil seal (113) are inserted into the lower space, a design that does not allow the insertion of all the components from a single end and which easily results in component droppage during assembly as well as other rather troublesome assembly difficulties. At the same time, since the degree of pressure sensitivity of the diaphragm (41), the ring shell (43) and the other pressure switch (4) components are of different design parameters, the pressure setting accuracy adjustments are often inconsistent and involves a lengthy testing period. (2) The seat area of the seal ring (10) in between the connector body (1) and the cap (2) is thin and fragile due to inadequate thickness and frequently breaks when impacted by rocks during the high speed rotation of the tire. (3) The enclosing of the connector body (1) in a metal protective shell (12) involves complex and difficult machine finishing and often leads to overall disassembly difficulties of the protective shell (12) and connector body (1).

SUMMARY OF THE INVENTION

The objective of the invention herein is to provide an improved tire pressure alarm device that includes the top-mounted cap of a connector body as well as a trigger device and a power supply fixture installed in the space within the interior section surrounded by the connector body and the cap, with a spring component positioned in between the trigger device and the power supply fixture; a pressure switch that includes an active recessed seat having a circular contact edge and which can be moved upwards and downwards within the confines of a guide ring mount, and has a bottom section against the top of the diaphragm; a hollow threaded base fixed to the mounting base at the upper extent of the active recessed seat and in which the coil spring at the lower threads and contained inside the active recessed seat is secured with an adjustment screw; a conductive ring, the circular edge of which is positioned such that the contact established with the outer circumference of the active recessed seat forms a state of power supply continuity between the conductive ring and the trigger device; a connector body that is comprised of a metal connector base and a plastic sleeve base that are integrated and formed as a single physical entity, with the said cap screwed onto the sleeve base; and a connector base that is separated by a spacer mount into two spaces, of which the space on one side has internal threads as well as a valve nozzle, and can be fastened to the threads on a tire valve stem, while the space on the other side conjoined to the sleeve base contains the components of the pressure switch and, furthermore, all components of the pressure switch are insertable in the same direction.

BRIEF DESCRIPTION OF THE DRAWINGS

Additional features and advantages of the invention herein shall become apparent in the following detailed description of the preferred embodiments with reference to the accompanying drawings, of which.

DETAILED DESCRIPTION OF THE INVENTION

Figure 1:
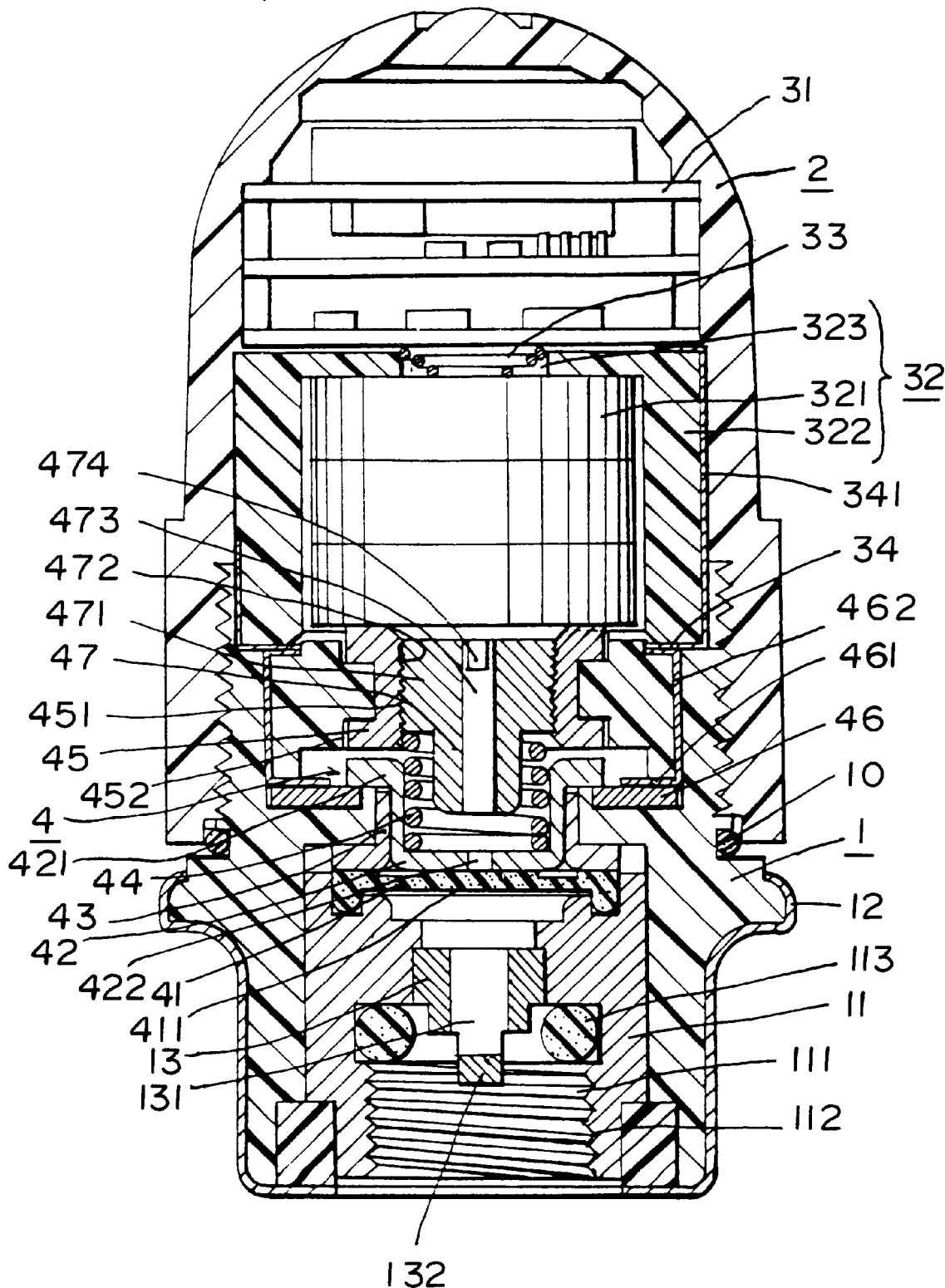
FIG. 1 is a cross-sectional drawing of a conventional tire pressure alarm device.
Figure 2:
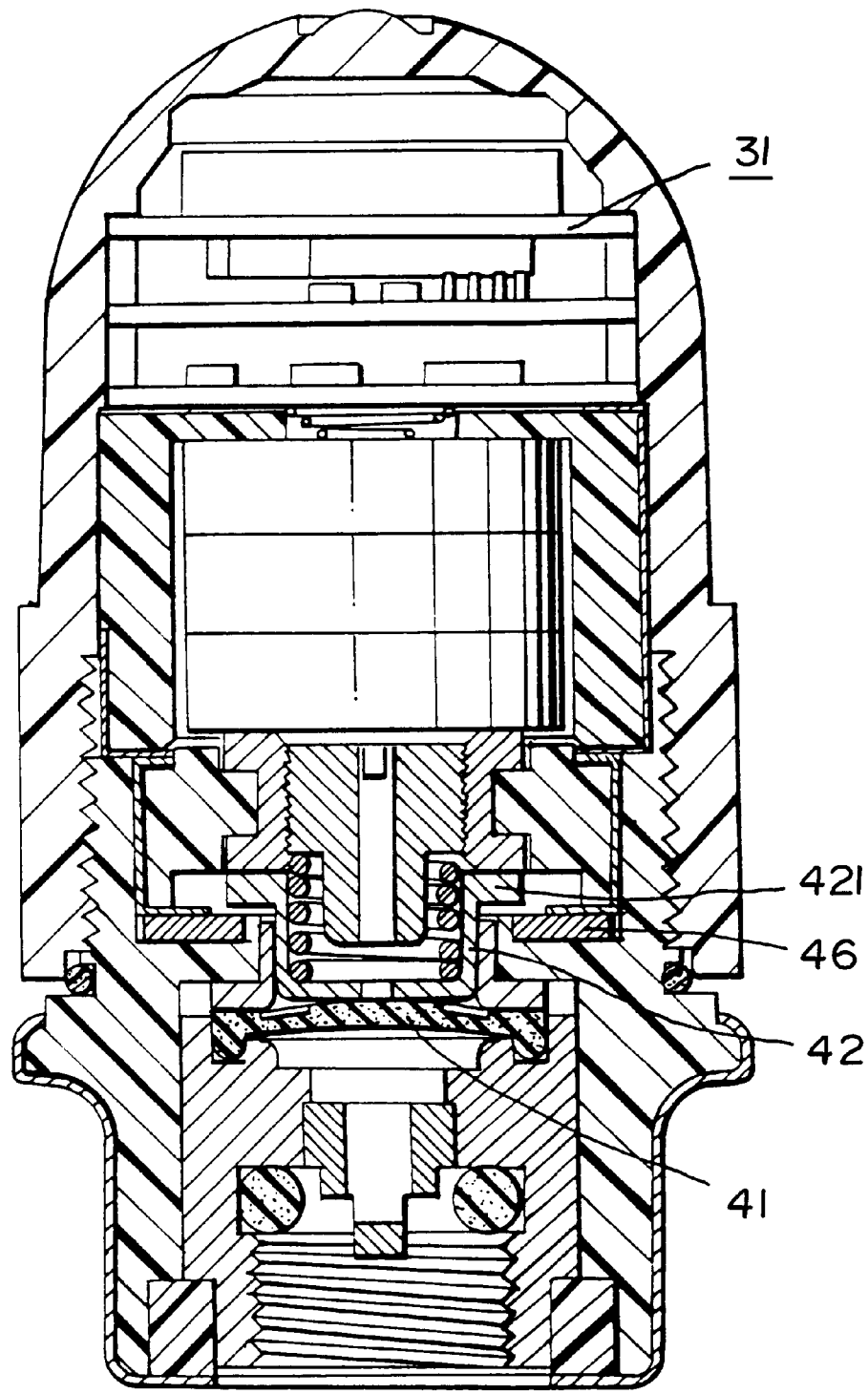
FIG. 2 is a cross-sectional drawing of the tire pressure alarm device of the invention herein.

In the detailed description of the preferred embodiments herein, similar elements are indicated by identical reference numerals throughout the disclosure.

Figure 3:
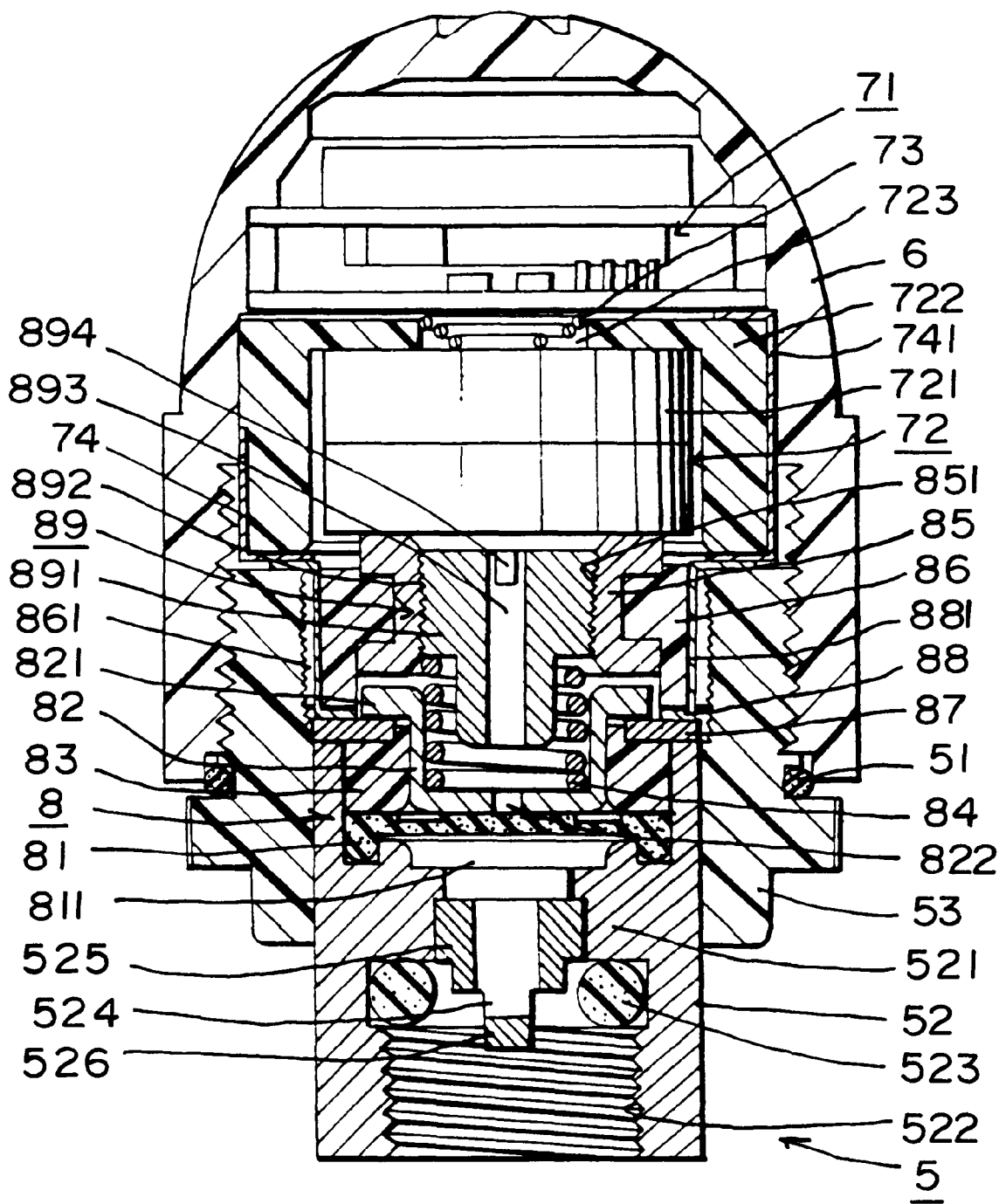
FIG. 3 is a preferred embodiment of the invention herein.

Referring to FIG. 3, the preferred embodiments of the invention herein include: a cap (6) screwed onto a connector body (5), a ring seal (51) placed between the connector body (5) and the cap (6), and assembled from top to bottom within the space internal to and surrounded by the connector body (5) and the cap (6) are two circuit boards and the electronic components mounted thereon of the trigger device (71), the power supply fixture (72) consisting of two batteries (721) installed in series, a sleeve shell (722) constructed of an insulative material and fitted externally over the batteries (721), an insertion hole (723) through the center of the upper section of the sleeve shell (722), a conical spring (73) that is installed in the insertion hole (723) and clipped between the trigger device (71) and the power supply fixture (72) to the uppermost section of the batteries (721), an extension ring (74) that is shouldered and vacant at the center and fitted onto the outer circumference around the lower section of the sleeve shell (722), and the said extension ring (74) has an extension strip (741) that protrudes upward and contacts the positive end of the said trigger device (71).

The connector body (5) is comprised of a metal connector base (52) and a plastic sleeve base (53) that are integrated and formed as a single physical entity, enabling the cap (6) to be screwed onto the sleeve base (53); the spacer mount (521) separates the connector base (52) into two spaces, of which one space has internal threads (522) that can be fastened to the threads on a tire valve stem; the said internal threads (522) have a oil seal (523) and a spacer mount (521) firmly installed in the air hole (524) through the center of the spacer mount (521) and the lower end at the bottom section (526) of the valve nozzle (525) can be moved downward to open the valve of the tire valve stem and thereby cause air to travel through the air hole (524) into the connector base (52).

A pressure switch (8) is contained within the internal space between the connector base (52) and the sleeve base (53) and, furthermore, the structural components of the said pressure switch (8) are all insertable in the same direction, including the connector base (52) spacer mount (521) facing the spacer mount (521) in the other space and, furthermore, the diaphragm (81) of the air pressure chamber (811) emerging from the surroundings of the spacer mount (521). There is an active recessed seat (82) that can be moved up and down within the confines of a guide ring mount (83), with the opening of the active recessed seat (82) facing upward and in addition expandable to form circular contact edge (821) and, furthermore, there is a hole (822) through center of the lower section that is subjected to the downward movement of the diaphragm (81). A coil spring (84) that is contained inside the active recessed seat (82). A hollow threaded base (85) that is fastened onto a mounting base (86) at the upper extent of the active recessed seat (82) and which has the internal threads (851), and the mounting base (86) is screwed onto the circumferential threads on the sleeve base (53). A conductive ring (87) that is fixed on the outer circumference of the active recessed seat (82) and which is in contact with the upper edge of the said connector base (52) and, furthermore, the top surface at the outer edge of the conductive ring (87) is fixed to and in contact with a relatively thin conductive extension ring (88), such that the upper end of the pair of extension strips (881) curving outward from the groove (861) in the two opposite sides of the said extension ring (88) and extending upward along the two sides of the mounting base (86) are in contact with the said sleeve shell (722) installed onto the extension ring (74) and connected to the circuit of the trigger device (71). An adjustment screw (89), of which the outer threads (892) on the head section (891) are screwed to the internal threads (851) inside a hollow threaded base (85) and that has a shaft hole (893) bored through the center of the head section (891) and a recessed slot (894) for a screw driver, which enables the upward and downward turning of the adjustment screw (89) to adjust the coil spring (84) that alters the degree of force applied against the diaphragm (81) by the active recessed seat (82).

Figure 4:
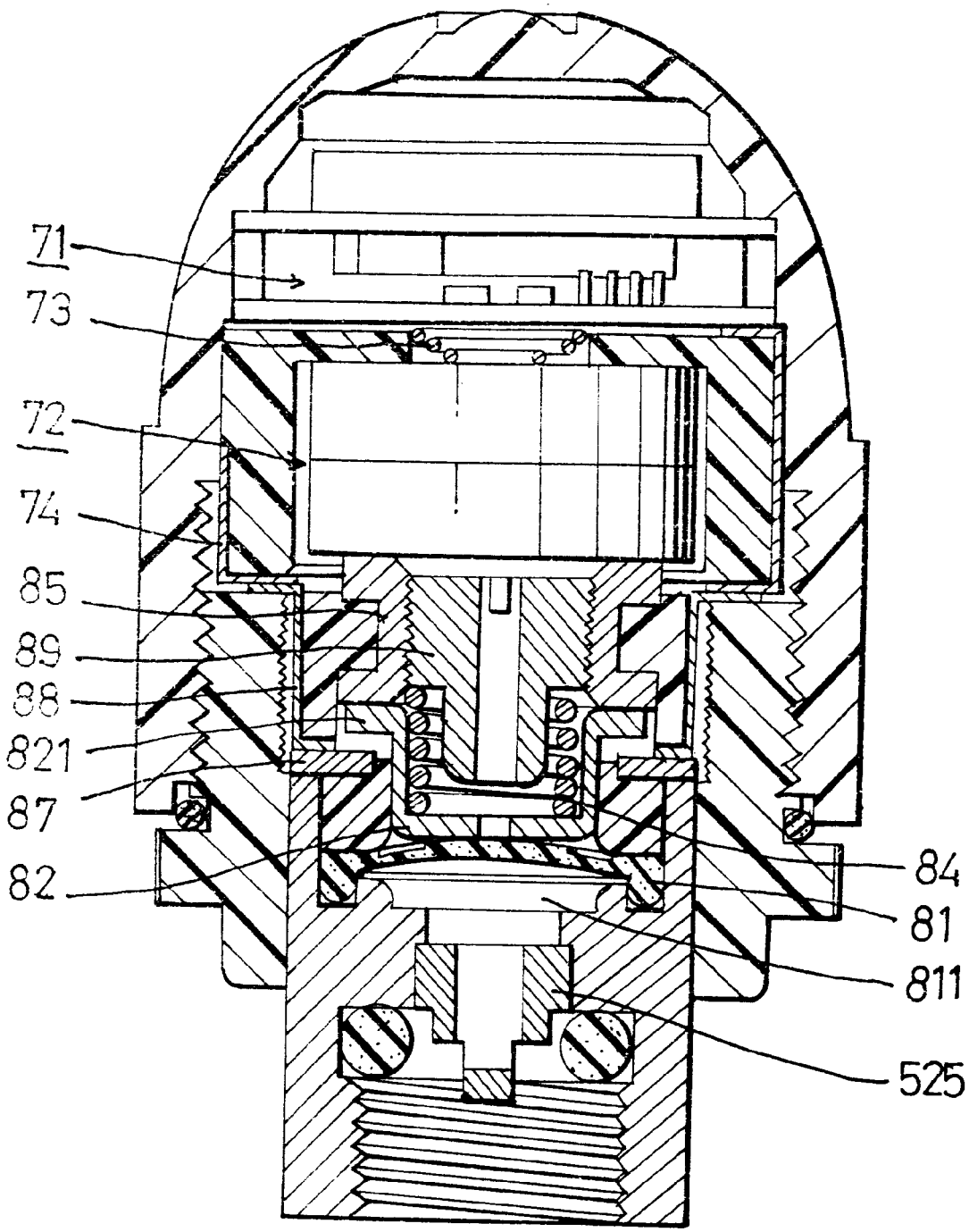
FIG. 4 is a preferred embodiment of the invention herein.

Referring to FIG. 4, when the preferred embodiment of the invention herein is installed onto a tire valve stem, air is delivered through the valve nozzle (525) of the preferred embodiment of the invention herein into the air pressure chamber (811) and when the air pressure of the tire exceeds the pressure setting of the coil spring (84), the air inside the pressure chamber (811) against the top of the membrane (81) pushes the active recessed seat (82), causing the circular edge (821) and the conductive ring (87) to separate which thereby results in a state of non-continuity in the circuit formed by the conductive ring (87), the conductive extension ring (88), the shouldered extension ring (74), the trigger device (71), the conical spring (73), the power supply fixture (72), the hollow threaded base (85), the adjustment screw (89), the coil spring (84) and the active recessed seat (82), which effectively prevents the trigger device (71) from producing an audible signal.

When the tire pressure is insufficient and the air pressure delivered into the pressure chamber (811) does not attain the set value of the coil spring (84), the coil spring (84), as indicated in FIG. 3, moves downward and when the circular edge (821) of the active recessed seat (82) contacts the conductive ring (87), the circuit enters a state of full continuity that enables the trigger device (71) to produce an audible signal which alerts the driver.

The advantages of the invention herein are: (1) The pressure switch (8) components are all contained at the same side of the space formed by the connector base (52) and the sleeve base (53) and, furthermore, since the said components are inserted in the same direction, therefore, assembly is not difficult, pressure setting accuracy adjustment is consistent and less testing time is required; (2) the connector body (5) consists of a sleeve base (53) and a metal connector base (52) and in addition to the higher durability of the connector base (52), at the easily damaged area of the ring seal (51), since the upper edge of the connector base (52) extends to and physically contacts the conductive ring (87), the connector base (52) and the sleeve base (53) essentially form a double layer that furthers augments the material strength and thereby effectively prevents breakage from rock impact as the tire rotates at high speed; (3) the connector body (5) does not involve complex metal machine finishing processes and, therefore, the installation of seals between the threaded bases or the threaded bases and the connector bodies of conventional devices are not necessary, which not only keeps the structure of the invention herein simple, but also utilizes fewer components and facilitates even more convenient assembly, without the possible separation of the shell from the connector body that readily occurs in the conventional devices for additional safety and a more economical cost.

The invention herein has been described in relation to what is considered the most practical and preferred embodiments, with the understanding that the invention herein is not limited to embodiments of the disclosure, but includes the various possible adaptations thereof covered within the spirit and scope of the broadest interpretations and equivalent configurations of the invention herein.

What is claimed is:

1. A tire pressure alarm device, comprising:

a connector body formed by a metal connector base and a plastic sleeve base which is connected to an upper portion of the metal connector base such that the connector base extends therefrom;

a top-mounted cap which is screwed onto the sleeve base to define an internal space with the connector body:

a spacer mount separating the connector base into an upper space and a lower space;

internal threads disposed on the connector base within the lower space and adapted to engage threads on a tire valve stem;

a valve nozzle providing fluid communication between the lower space and the upper space;

a trigger device and a power supply fixture installed within the internal space;

a conical spring positioned in between the trigger device and the power supply fixture; and a pressure switch disposed within the upper space and the internal space, said pressure switch having components including a diaphragm, a guide ring mount, a conductive ring, an active recessed seat with a circular contact edge, a coil spring, a hollow threaded base, a mounting base, and an adjustment screw of the coil spring, the active recessed seat having a lower section positioned against a top of the diaphragm and being capable of upward and downward movement within the guide ring mount, the hollow threaded base being fastened onto the mounting base at an upper extent of the active recessed seat, the coil spring being seated within the active recessed seat, the adjustment screw being screwed into the hollow threaded base and extending to contact the coil spring, the conductive ring being supported by the guide ring mount such that the active recessed seat completes an electrical circuit of the conductive ring, the trigger device and the power supply fixture when the circular contact edge thereof is in contact with the conductive ring, the components of the pressure switch being inserted in the same direction.

2. A tire pressure alarm device according to claim 1, wherein the mounting base of the pressure switch is screwed onto the sleeve base.

3. A tire pressure alarm device according to claim 1, further comprising:

at least one groove in the mounting base which opens at each side thereof; and at least one extension ring disposed in the groove, the extension ring having extension strips which project from the groove at each side;

wherein the conductive ring contacts the extension strips such that the active recessed seat completes an electrical circuit of the conductive ring, the extension ring, the trigger device and the power supply fixture when the circular contact edge thereof is in contact with the conductive ring.

4. A tire pressure alarm device according to claim 1, wherein the connector base extends into the sleeve base beyond at least the height of a sealing point between the sleeve base and the top-mounted cap and physically contacts the conductive ring.

* * * * *